United States Patent [19]

Hurtado

[11] Patent Number: 4,514,936
[45] Date of Patent: May 7, 1985

[54] LATHE DUST ENCLOSURE

[76] Inventor: Ruben G. Hurtado, 106 Sylvia, San Antonio, Tex. 78237

[21] Appl. No.: 543,308

[22] Filed: Oct. 19, 1983

[51] Int. Cl.³ .............................................. B24B 55/06
[52] U.S. Cl. ....................................... 51/270; 51/273;
  51/281 R; 409/134; 409/137; 408/241 G;
  82/DIG. 2; 29/DIG. 84; 29/DIG. 86; 15/301
[58] Field of Search ................. 51/270, 273, 268, 272,
  51/281 R; 29/DIG. 86, DIG. 50, DIG. 53,
  DIG. 84, DIG. 101, DIG. 104; 409/134, 137;
  408/67, 241 G; 82/DIG. 2, DIG. 1, 1 C;
  15/301

[56] References Cited

U.S. PATENT DOCUMENTS

| | | | |
|---|---|---|---|
| 1,047,571 | 12/1912 | Sadler | 51/272 |
| 1,393,892 | 10/1921 | Luden | 51/270 |
| 1,977,386 | 10/1934 | Holes | 51/270 |
| 2,111,782 | 3/1938 | Hudson | 51/270 |
| 2,281,313 | 4/1942 | Kumnick | 51/273 |
| 2,324,019 | 7/1943 | Pfau et al. | 51/273 |
| 2,516,839 | 8/1950 | Allen, Jr. et al. | 51/268 |
| 2,907,200 | 10/1959 | Roberts et al. | 51/273 |
| 3,378,998 | 4/1968 | Shackelford | 15/301 |
| 3,808,750 | 5/1974 | Mann | 51/273 |

FOREIGN PATENT DOCUMENTS 108742  1/1928  Fed. Rep. of Germany ........ 51/270

OTHER PUBLICATIONS

Tepco, Inc., "Dust Collection Systems" brochure.
AMMCO Catalog entitled "Tools and Equipment for the Professional", (p. 53).
Owens/Corning brochure.

Primary Examiner—Roscoe V. Parker
Attorney, Agent, or Firm—Gunn, Lee & Jackson

[57] ABSTRACT

Method and apparatus for collecting dust and shavings produced by a drum and disc lathe. The apparatus comprises a sealed housing which is adapted to enclose the entire grinding or cutting area of the lathe and trap airborne particles suspended therein. A brake drum or disc is attached to the lathe arbor within the housing through a housing access door prior to the machining operation. The cutting tool extends from the lathe into the housing through an orifice which is covered by a plurality of sealing strips. As the drum or disc is machined, the suspended asbestos and metal dust is removed from the housing to a collection receptacle by the directional air flow from a fan and the heavier metal shavings are collected in a tray located on the housing floor.

12 Claims, 5 Drawing Figures

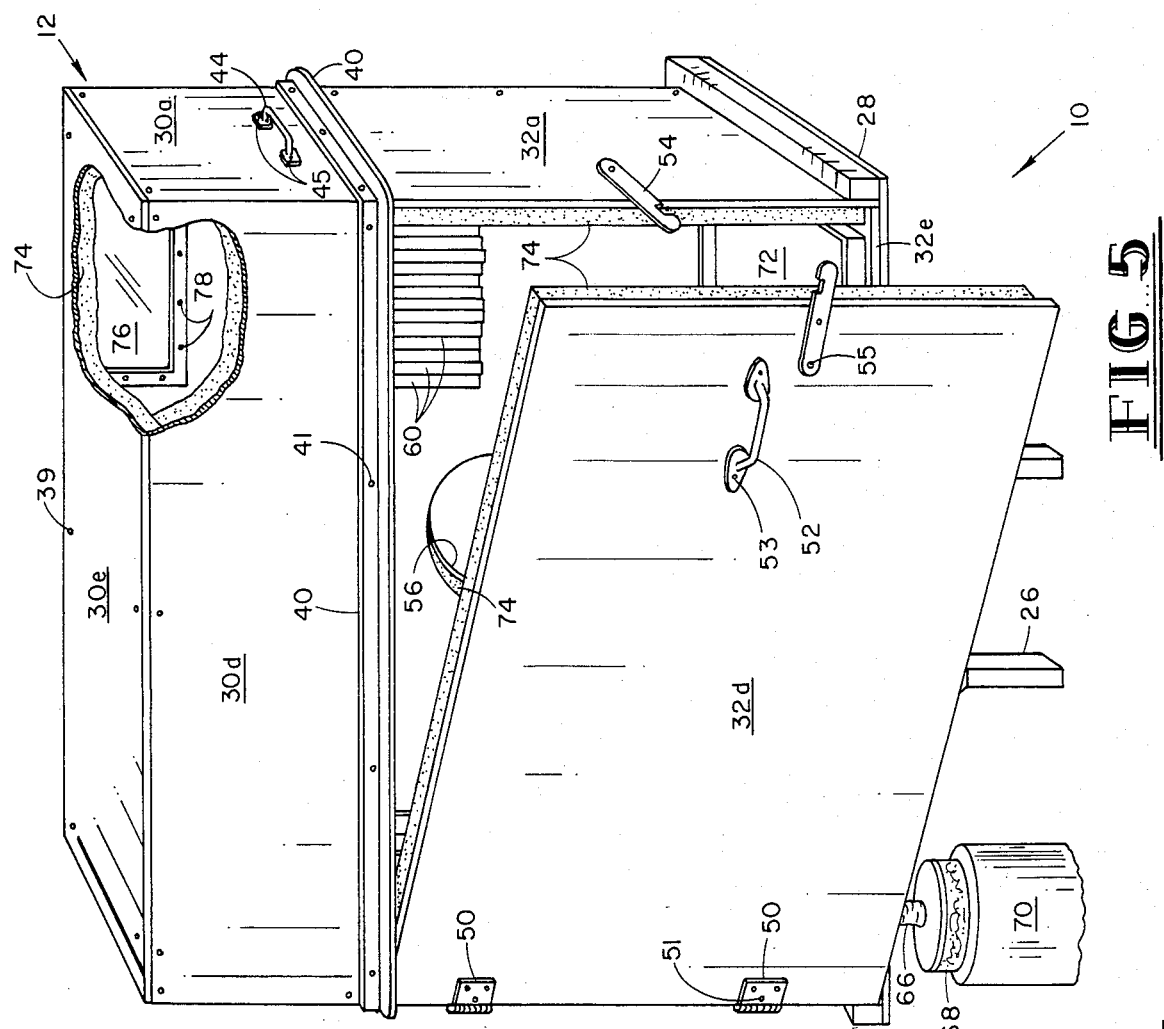
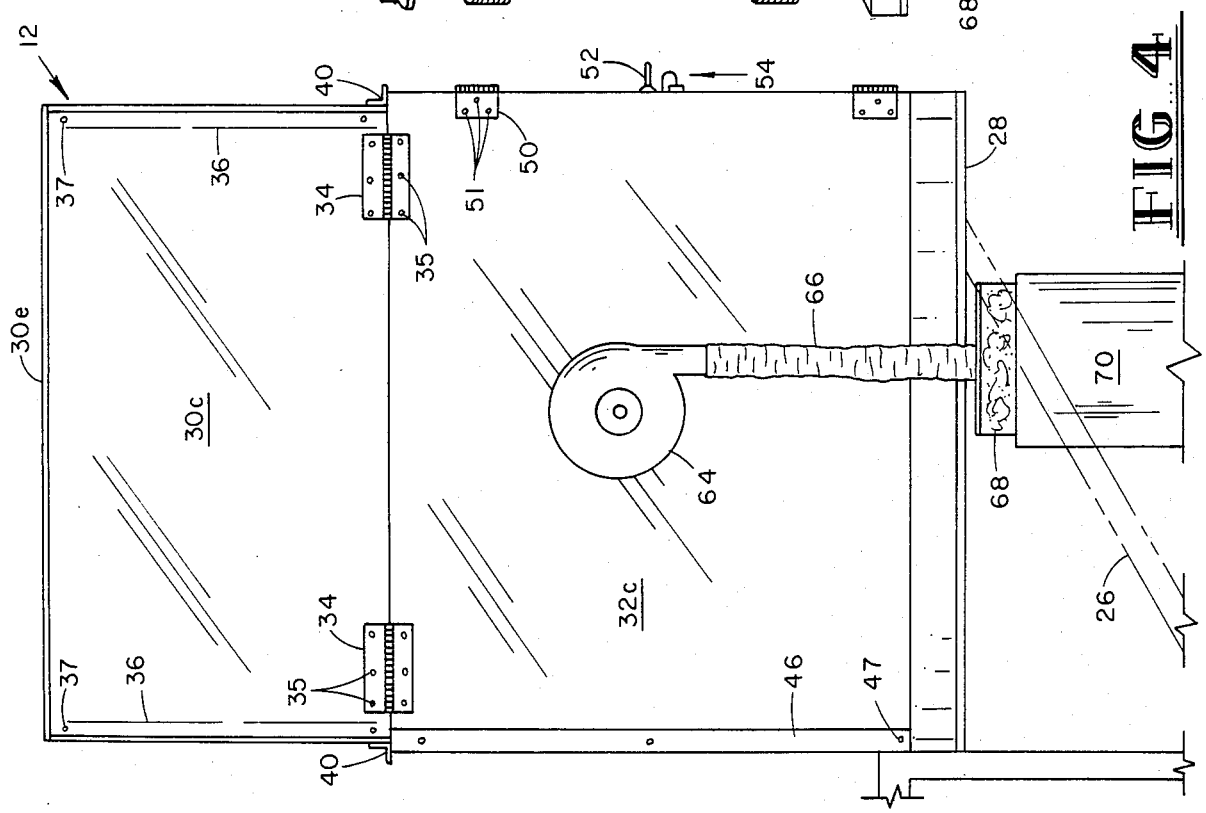

LATHE DUST ENCLOSURE

BACKGROUND OF THE INVENTION

The present invention provides an enclosure or housing for collecting airborne asbestos and metal dust produced during the operation of a drum and disc lathe. Automotive brake drums and rotors or discs typically become imbedded with the asbestos contained within the friction materials, such as the brake shoes or disc pads, which are gradually ground into the drum or rotor during use. The drums and rotors must therefore be resurfaced at regular repair intervals in order to continue usage of the drum or rotor with new brake shoes or disc pads. This procedure typically involves the grinding or machining of the brake drum or rotor on a drum and disc lathe to restore its outer surface to its original condition. Due to the hazards associated with the airborne asbestos and metal dust produced during the grinding operation, the present invention is directed primarily toward the safety and health concerns of the lathe operator and others in proximity with the lathe.

BRIEF DESCRIPTION OF THE PRIOR ART

Despite the hazards associated with their operation, many drum and disc lathes do not include any type of dust control system. The dust control systems which are utilized typically comprise either a large dust room within which the lathe is enclosed or a type of suction hose connected to the lathe near the grinding area. A tray may also be attached to the lathe or lathe bench in an attempt to collect the heavier metal shavings. Utilization of a large dust room has the increased hazard of requiring the lathe operator to enter the dust filled room at frequent intervals and such dust rooms frequently permit direct exhaust of the hazardous dust to the atmosphere without the filtering thereof. Furthermore, the asbestos and metal dust and heavier metal shavings typically collect on the floor, lathe, and/or other locations within the dust room, thereby creating a hazardous and dirty work environment. Finally, utilization of a suction hose near the grinding area of the lathe is only partially effective for collecting dust and does not create the healthy and clean environment resulting from usage of the present invention.

Various types of hoods and other apparatus for collecting suspended by-products produced by machines other than brake drum and disc lathes are also disclosed in the prior art. For example, U.S. Pat. No. 2,516,839 issued to Allen, Jr., et al. discloses an exhaust hood which has an opening in the bottom thereof and an adjustable opening in a side thereof. The side and bottom openings permit the sliding movement of a work carriage therethrough at a right angle to and into working relationship with a rotatable cutter. The pan attached to the movable carriage covers the bottom opening when the carriage is in working relationship with the cutter. During the work process, the cutter rotates in a clockwise direction to cut chips from the work and throw them toward a tapered portion of the exhaust hood opposite the side opening prior to their removal therefrom by a suction header. The hood in Allen, Jr., et al. is further adapted to permit removal of the spindle and cutter without dismantling the hood from the machine.

U.S. Pat. No. 1,047,571 issued to Sadler discloses an open sided polishing hood having an access opening on the forward end thereof. The side plates of the polishing hood are inclined toward each other at the rearward end thereof to permit rearward deflection of the polishing or grinding by-products away from the open side. A suction pipe connected to the bottom of the hood withdraws the polishing or grinding by-products therefrom and a downwardly inclined glass guard protects the operator against flying sparks and other particles of matter.

U.S. Pat. No. 2,324,019 issued to Pfau, et al. discloses an open sided work cabinet having an upper and lower section. The work is machined in the upper section while one or more suction conduits on the rear wall of the upper section withdraw suspended dust from the cabinet to a dust separator and dust collector located at the rear of the cabinet. The patent to Pfau, et al. also discloses a plurality of glass containing frames to protect the workman who stands at the open side of the cabinet and an inclined plate to collect heavy particles falling from the workpiece.

The patents to Allen, Jr., et al., Sadler, and Pfau, et al. all disclose open sided apparatus which are designed primarily to protect the operator against flying chips, sparks, and/or other particles of matter which result from a cutting, polishing, or machining operation. Furthermore, the open sided designs of Allen, Jr., et al., Sadler, and Pfau, et al. are designed to permit movement of and/or direct operator control over the work through their open sides during the cutting, polishing, or machining process. Neither Allen, Jr., et al., Sadler, nor Pfau, et al. disclose a housing which may be substantially sealed prior to the machining process and which remains sealed until the completion thereof. Furthermore, Allen, Jr., et al., Sadler, and Pfau, et al. do not suggest an apparatus for enclosing the entire grinding area of a drum and disc lathe and, in fact, the devices disclosed by these patents are not designed or intended to accomodate a drum and disc lathe. Finally, the open sided designs of Allen, Jr., et al., Sadler, and Pfau, et al. are inconsistent with the health concerns associated with the operation of a drum and disc lathe.

U.S. Pat. No. 2,281,313 issued to Kumnick discloses a chamber for enclosing a buffing machine. The buffing machine comprises a turntable for carrying a plurality of spindles thereon past one or more work stations provided with buffing wheels adapted to operate on work carried by the spindles. As the turntable rotates, the spindles move in and out of the chamber through openings therein. Kumnick also discloses the use of ducts having nozzles secured thereto and an exhaust fan for removing the lighter dust suspended in the air during the buffing operation. Finally, Kumnick discloses a plurality of openings in the chamber to permit the operator to watch the progress of the work as it moves around on the turntable.

U.S. Pat. No. 3,378,998 issued to Shackelford discloses an enclosure adapted for various types of machines and an exhaust system for removing suspended particles therefrom. U.S. Pat. No. 2,907,200 issued to Roberts, et al. discloses a type of container which is provided with an exhaust system.

Neither Kumnick, Shackelford, nor Roberts, et al. are related to or directed toward a substantially sealed enclosure for the entire cutting or grinding area of a drum and disc lathe. Once again, the devices disclosed in these patents are not designed nor intended to accomodate drum and disc lathes. None of the aforementioned patents teach or suggest an apparatus, housing, or method which achieves the benefits and objects of the present invention.

SUMMARY OF THE INVENTION

It is a primary object of the present invention to provide an apparatus for collecting dust and shavings produced during the operation of a drum and disc lathe.

It is another object of the present invention to provide a housing for enclosing and substantially sealing the entire grinding or cutting area of a drum and disc lathe.

It is still another object of the present invention to provide a method for collecting dust and shavings produced during the operation of a drum and disc lathe.

It is a further object of the present invention to provide a housing for enclosing the entire grinding area of a lathe which permits the operation of the lathe exterior to the housing and which substantially reduces the ubiquitous dust and shavings in the vicinity of the lathe and the accoustic and thermal pollution created by the machining of the work.

It is yet a further object of the present invention to provide a housing for enclosing the entire grinding area of a lathe which can be easily removed from the lathe, is easy to clean, and is readily adaptable to most drum and disc lathes.

It is still a further object of the present invention to provide a housing which is adapted to keep a drum and disc lathe free of dust and shavings and which protects the lathe operator from the hot metal shavings produced during the grinding operation.

It is still a further object of the present invention to provide an efficient apparatus for collecting dust and shavings produced during the operation of a drum and disc lathe which is compact, to permit operation in restricted size areas, and inexpensive to manufacture and operate.

These and other objects are achieved in the present invention by a housing which is adapted to enclose and substantially seal the entire grinding area of a conventional drum and disc lathe. The housing comprises a top hingedly secured to a bottom, the top having a ceiling on the upper end thereof and the bottom having a floor on the lower end thereof. The bottom comprises a plurality of side panels, including a first panel which has a first orifice of sufficient size for receivng the lathe arbor therethrough and a second orifice for receiving a cutting or grinding tool therethrough which is attached to the lathe. The second orifice is substantially covered by a plurality of flexible sealing strips which are attached to the top of the housing and hang therefrom.

A second bottom panel opposite the first and second orifices is hingedly connected to the bottom for permitting access to the interior of the housing. The invention apparatus also comprises a suction fan connected to yet another panel in the bottom of the housing. A hose exterior to the housing is connected on a first end thereof to the fan and on a second end to a filter which is connected to the top of a collection receptacle.

Once the arbor and cutting tool have been properly received through the first and second orifices, respectively, the brake drum or disc is attached to the arbor within the housing through the bottom access panel and the grinding area is enclosed. During the subsequent grinding process, the fan continuously removes the airborne asbestos dust and metal dust from the housing by drawing air through the first and second orifices past the grinding area and out of the housing. The airborne particles withdrawn by the controlled, directional air flow past the grinding area are thereafter passed through the hose to the filter. As the withdrawn air passes therethrough, the filter collects most of the hazardous dust while the remainder is received by the collection receptacle. The heavier metal shavings which are not withdrawn by the fan are collected by a tray on the floor of the housing which can be readily removed and cleaned subsequent to the grinding operation.

The invention apparatus thus comprises a housing and accompanying dust collection system which eliminate the hazardous airborne dust which is subject to inhalation and the heavier metal shavings which normally collect in the vicinity of the lathe, which have heretofore created an unhealthy and undesirable work environment. The invention apparatus therefore overcomes the limitations inherent in the usage of large dust rooms, suction hoses, and other devices disclosed in the prior art which do not adequately address the health, safety, and other concerns of those familiar with the operation and specific requirements of drum and disc lathes. Furthermore, the invention method for collecting dust and shavings produced during the operation of a drum and disc lathe comprises the steps of attaching the work to be machined to the lathe, enclosing or substantially sealing the grinding area of the lathe, withdrawing the dust from the enclosed grinding area to a dust receptacle exterior to the enclosed area, and receiving the metal shavings in a shavings receptacle within the enclosed grinding area.

BRIEF DESCRIPTION OF THE DRAWINGS

FIG. 4 is a side plan view of the invention lathe dust enclosure illustrating the fan, hose, filter, and collection receptacle.

FIG. 5 is a perspective view of the invention lathe dust enclosure illustrating the opening of the bottom access door, the shaving tray, and the thermal and/or accoustic insulation.

DETAILED DESCRIPTION OF THE PREFERRED EMBODIMENT

Figure 1:
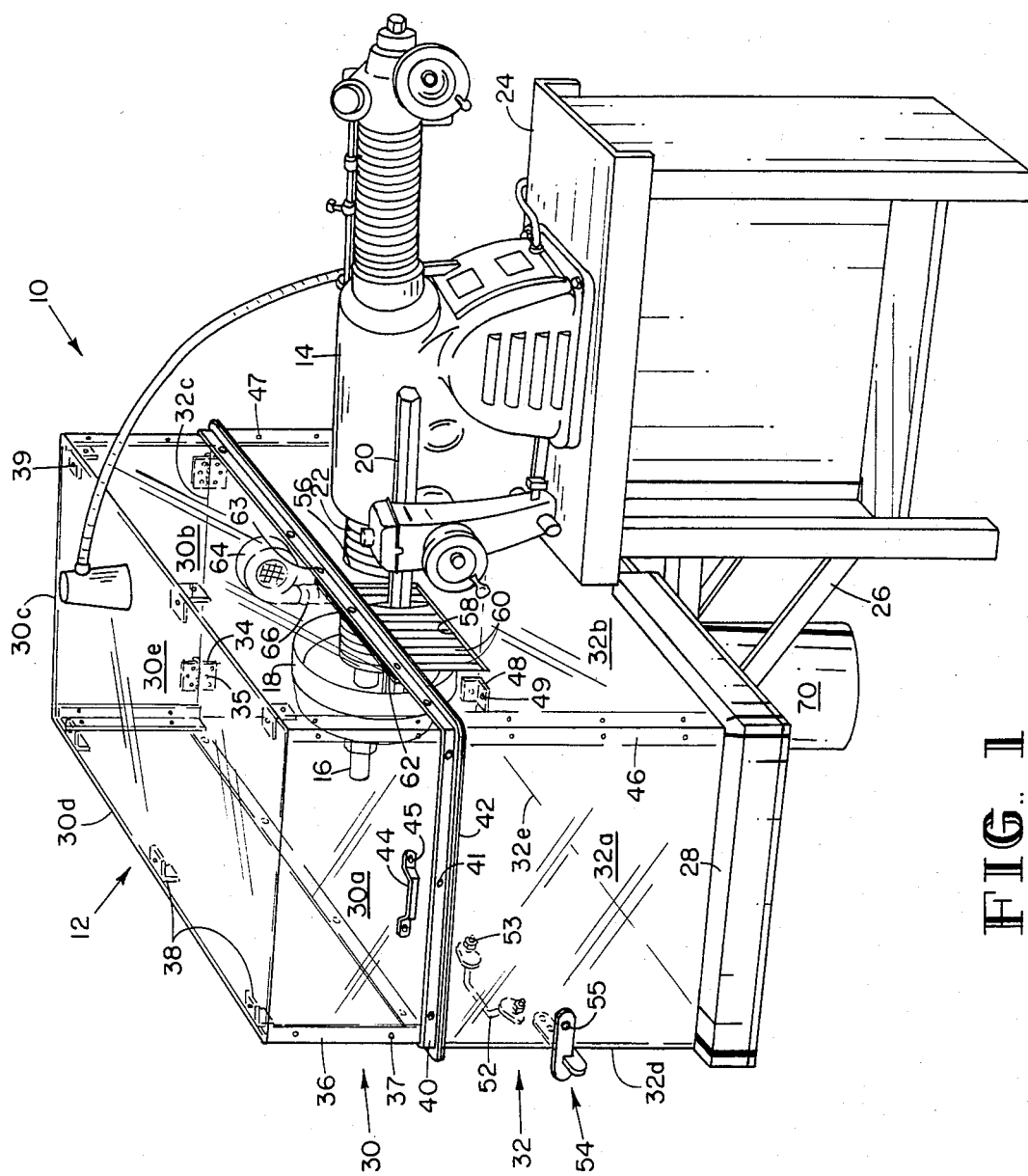
FIG. 1 is a perspective view of the invention apparatus enclosing the grinding area of a lathe.
Figure 2:
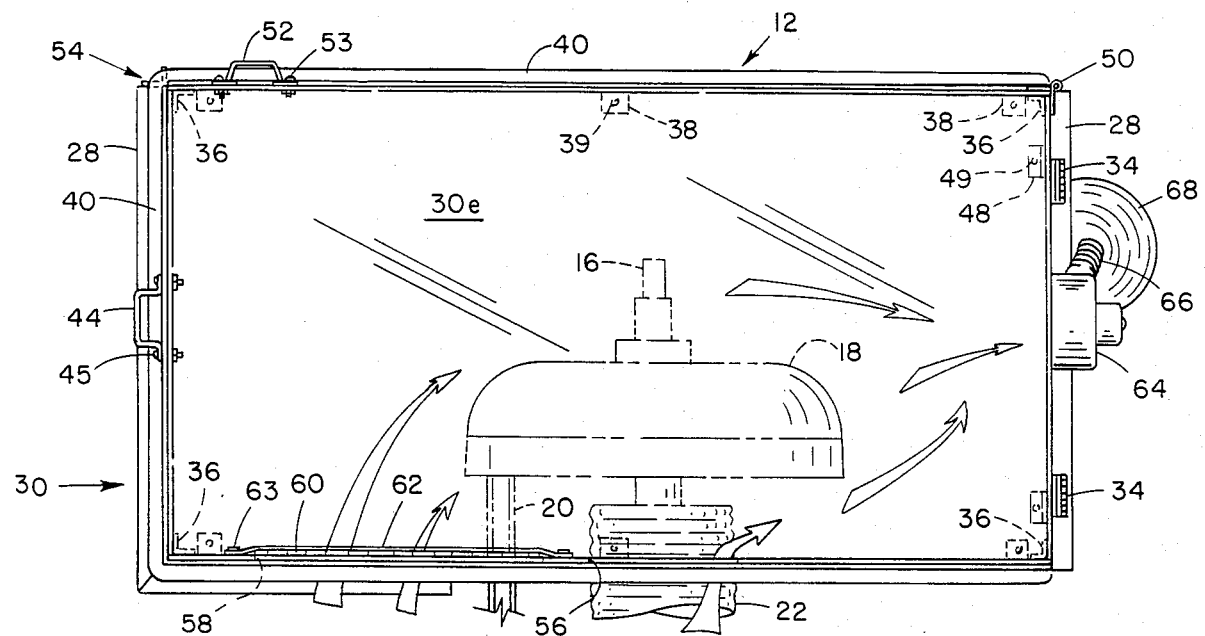
FIG. 2 is top plan view of the invention lathe dust enclosure illustrating air flow within the enclosure.

Referring to FIG. 1, the invention apparatus is identified by the number 10. The invention apparatus comprises a housing or enclosure 12 which is designed to enclose and substantially seal the entire grinding area of a conventional brake drum and disc lathe 14, as illustrated in FIG. 1 and FIG. 2. The drum and disc lathe 14 typically comprises an arbor 16 upon which the brake drum or disc 18 is mounted. The lathe 14 is also adapted to permit the attachment of a cutting tool 20 thereto and typically comprises a protective boot 22 which protects the arbor bearings (not shown) and lathe spindle (not shown) from dust and shavings produced during the operation of the lathe 14.

As further illustrated in FIG. 1, the lathe 14 typically rests on or is supported by a bench or table 24. For purposes of utilizing the present invention, the bench 24 may be modified to comprise a pair of flat iron supports 26, which are connected to and extend outward from the bench 24, for supporting the housing 12. The housing 12 may also rest within and be supported by a wooden deck 28. The deck 28 is located underneath the housing 12 and preferably includes a frame which extends around a part of the lower portion of the housing 12. It is to be understood, however, that the invention housing 12 may be mounted to lathe 14 and supported and/or positioned in any convenient manner as dictated by the particular requirements of the lathe utilized.

Figure 3:
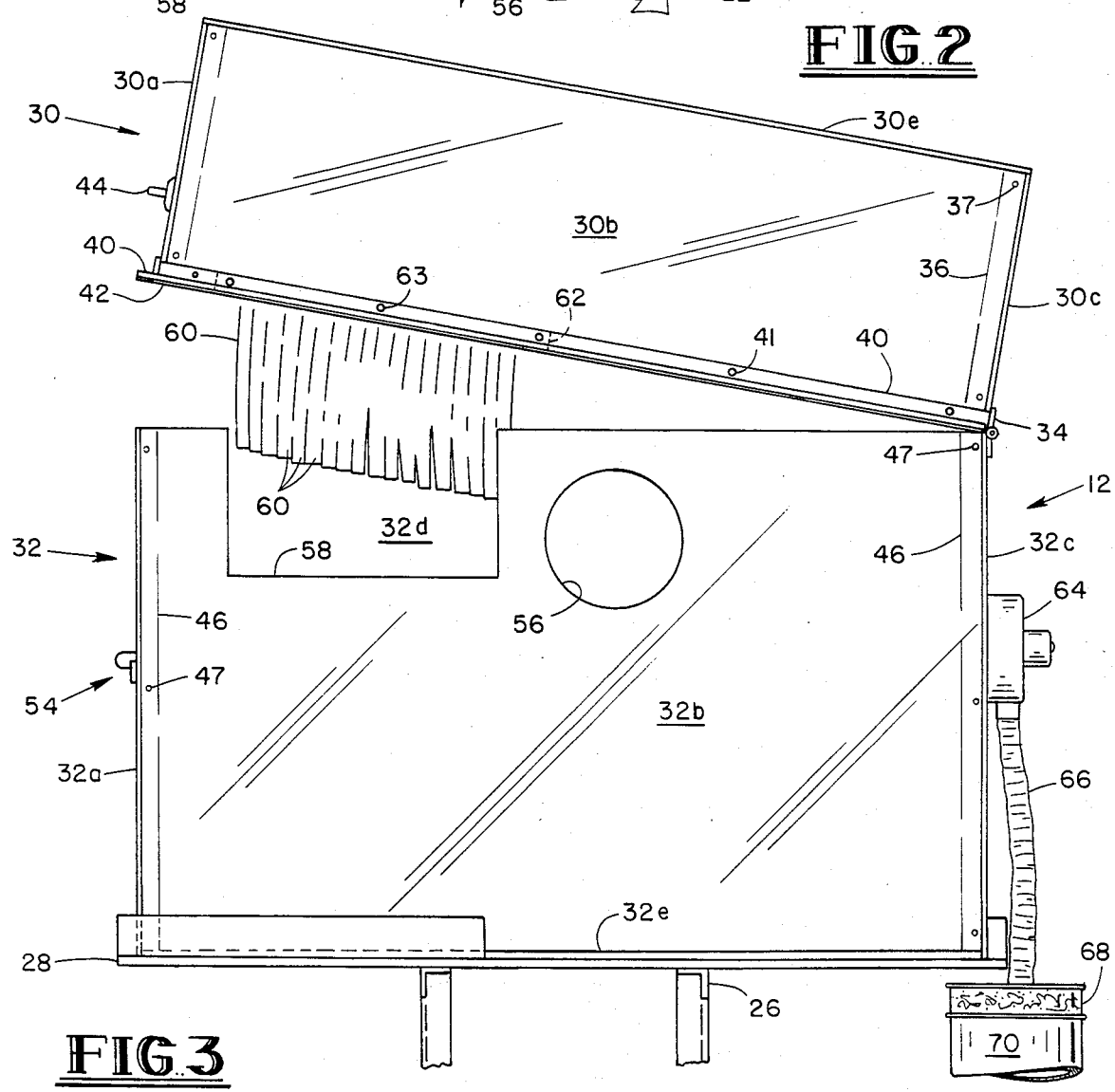
FIG. 3 is a side plan view of the invention lathe dust enclosure illustrating the opening of the top of the enclosure.

As illustrated in FIG. 1, FIG. 2, and FIG. 3, the invention housing 12 comprises a top 30 which is hingedly connected to a bottom 32 by a pair of hinges 34 which are secured therebetween by rivets or screws 35. Top or lid 30 comprises a plurality of sides or panels 30a, 30b, 30c, 30d, and a ceiling 30e, all of which have a thickness of approximately three-sixteenths (3/16) inches and are preferably constructed of transparent plexiglass, plastic, or acrylic resin in a substantially rectangular shape. Top walls or panels 30a, 30b, 30c, and 30d are secured by four interior metal angles 36 which are attached to the appropriate panels at the vertical corners of top 30 by a plurality of rivets or screws 37. As illustrated in FIG. 1 and FIG. 2, top ceiling panel 30e is secured to top side panels 30b and 30d by a plurality of interior metal angles 38 which are attached to the respective panels and the ceiling 30e along the common borders therebetween by a plurality of rivets or screws 39.

As further illustrated in FIG. 1, FIG. 2, and FIG. 3, an exterior ledge or angle 40 is connected to top side panels 30a, 30b, and 30d by a plurality of rivets or screws 41 extending through the vertical portion of ledge 40 and the respective panels. As illustrated in FIG. 3, the underside of the horizontal portion of ledge 40 is provided with a foam or sealant tape 42. In the preferred embodiment, ledge 40 is a one (1) inch by one (1) inch aluminum right angle and tape 42 is a one-half ($\frac{1}{2}$) inch by one-half ($\frac{1}{2}$) inch self-adhesive foam tape. Tape 42 and the horizontal portion of ledge 40 rest on the uppermost edge of bottom 32 when the top 30 is closed or down, as illustrated in FIG. 1. As illustrated in FIG. 2 and FIG. 3, top 30 may be raised or opened by grasping and lifting handle 44 which is secured to side panel 30a by a pair of rivets or screws 45.

In the preferred embodiment, top side panels 30b and 30d have a length of approximately thirty-two (32) inches and a height of approximately twelve (12) inches. Top side panels 30a and 30c preferably have a length of approximately twenty-two (22) inches and a height of approximately twelve (12) inches. Ceiling 30e preferably has a length of approximately thirty-two (32) inches and a depth of approximately twenty-two (22) inches corresponding to side panels 30a, 30b, 30c and 30d.

As further illustrated in FIG. 1 and FIG. 3, the bottom 32 comprises a plurality of sides or panels 32a, 32b, 32c, 32d, and a floor 32e, all of which have a thickness of approximately three-sixteenths (3/16) inches and are preferably constructed of transparent plexiglass, plastic, or acrylic resin in a substantially rectangular shape similar to the shape of top 30. Bottom walls or panels 32a, 32b and 32b, 32c are secured together by two metal angles 46 which are attached to the respective panels by a plurality of rivets or screws 47 at the inside vertical corners of bottom 32 opposite panel 32d. In the preferred embodiment, bottom side panels 32b and 32d have a length of approximately thirty-three (33) inches and height of approximately twenty (20) inches. Bottom side panels 32a and 32c preferably have a length of approximately twenty-three (23) inches and a height of approximately twenty (20) inches. The dimensions of bottom 32 thus correspond to those of top 30 to allow the horizontal portion of ledge 40 to rest atop the uppermost edge of the bottom panels 32a, 32b and 32d. Finally, floor panel 32e preferably has a length of approximately thirty-three (33) inches and a depth of approximately twenty-three (23) inches corresponding to side panels 32a, 32b, 32c, and 32d.

As illustrated in FIG. 1 and FIG. 2, floor 32e is secured to bottom panels 32a, 32b, and 32c by a plurality of metal angles 48 which are attached to the respective panels and the floor 32e along the common borders therebetween by a plurality of rivets or screws 49. As illustrated in FIG. 4 and FIG. 5, bottom panel 32d is hingedly connected to bottom panel 32c by a pair of hinges 50 which are secured therebetween by rivets or screws 51. Bottom panel 32d is further provided with a handle 52 which is secured thereto by a pair of rivets or screws 53. As illustrated in FIG. 1 and FIG. 5, bottom panels 32a and 32d are provided with a mating latch assembly 54 which is secured to the respective panels by rivets or screws 55.

As illustrated in FIG. 3, bottom panel 32b has a first substantially circular orifice 56 extending therethrough, preferably having a diameter of approximately four and one-half ($4\frac{1}{2}$) inches. Bottom panel 32b also has a second, three-sided, substantially rectangular orifice 58 extending therethrough, preferably having a width of approximately ten (10) inches and a height of approximately five and one-half ($5\frac{1}{2}$) inches. As illustrated in FIG. 1 and FIG. 3, second orifice 58 is adapted to be substantially covered by a plurality of vinyl sealing strips 60 when top 30 is lowered onto bottom 32. As illustrated in FIG. 2 and FIG. 3, strips 60 are secured to top 30 by a sealing strip bar 62 which impinges against and covers the uppermost portion of strips 60 and is connected to the vertical portion of ledge 40 on the inside of panel 30b by a plurality of rivets or screws 63. It is to be understood, however, that sealing strips 60 may be connected to top 30 in any convenient manner as long as they are able to hang freely therefrom and are of sufficient number to substantially cover or seal orifice 58 when top 30 is down.

As illustrated in FIG. 4, a suction fan or swirl cage exhaust fan 64 is appropriately connected to bottom panel 32c by bolts (not shown) with an "O" ring seal (not shown) therebetween and is in communication with an appropriate power supply (not shown). A hose 66 is connected on a first end thereof to the outlet portion of fan 64 and on a second end thereof to a filter 68 which is connected to the top of a dust bucket or collection receptacle 70. As illustrated in FIG. 5, access to the interior of housing 12 can be accomplished by releasing latch mechanism 54 and pulling on handle 52, thereby opening access panel or door 32d. As further illustrated in FIG. 5, the invention housing 12 may also be provided with a tray 72 which rests on the floor 32e for collecting heavy metal shavings which fall from work 18 in the grinding area of lathe 14. The housing 12 may also be provided with accoustic and/or thermal insulation 74 which is appropriately secured to the respective panels in top 30 and bottom 32, as further illustrated in FIG. 5. Insulation 74 substantially reduces the noise and heat levels in the vicinity of the enclosure 12 during the machining operation, thereby creating a more pleasant working environment. Finally, in the event the enclosure 12 is provided with insulation 74, as illustrated in FIG. 5, the enclosure 12 may also be provided with a window 76 which is secured to a panel of the housing 12 by rivets or screws 78 to permit the lathe operator to view the machining operation.

The enclosure of the grinding area of the lathe 14 and utilization of the invention apparatus 10 to collect dust and shavings produced therefrom is accomplished in accordance with the following method or procedure. The lathe operator initially inserts the lathe arbor 16 through first orifice 56, as illustrated in FIG. 1 and FIG. 2. It is to be understood that the protective boot 22 will thereafter substantially cover or seal first orifice 56 to prohibit the outward passage of dust and/or metal shavings therethrough but will permit the inward passage of a slight amount of ambient air through first orifice 56 into housing 12. The brake drum or disc 18 to be machined is thereafter attached to the arbor 16 through open access panel 32d. The appropriate cutting tool 20 is thereafter attached to lathe 14 to extend through second orifice 58 in contact with or proximity to the drum or disc 18. The proper attachment and/or adjustment of cutting tool 20 can be most readily achieved without the interference of the sealing strips 60 by raising top 30, as illustrated in FIG. 3. Once the drum or disc 18 is properly connected to lathe arbor 16 and cutting tool 20 is properly positioned with respect thereto, top 30 is lowered and bottom access panel 32d is closed and secured by latch assembly 54.

It is to be understood that when top 30 is closed or lowered, flexible sealing strips 60 will permit the passage of cutting tool 20 through second orifice 58 but will otherwise substantially cover or seal second orifice 58 to prohibit the outward passage of dust and/or metal shavings therethrough. Nevertheless, sealing strips 60 will permit the inward passage of ambient air through second orifice 58 into housing 12. In the preferred embodiment, sealing strips 60 are formed by cutting slits in a single piece of vinyl, the upper portion of which is covered by bar 62. It is also to be understood that when top 30 and bottom access panel 32d are closed, sealing tape 42 will seal the common border or interface between top 30 and bottom 32. The aforementioned features of the invention apparatus 10 thus create a substantially sealed enclosure 12 for enclosing and substantially sealing the grinding or cutting area of the lathe 14.

Once the work 18 is secured, the cutting tool 20 is positioned, and the housing 12 is sealed, the lathe 14 and fan 64 are turned ON. During the subsequent grinding process, the fan 64 continuously removes the airborne asbestos and metal dust from the housing 12. The fan 64 also draws air from the exterior of the housing 12 through the first orifice 56 and the second orifice 58, as illustrated by the arrows in FIG. 2. The controlled air flow past the grinding area away from first orifice 56 and/or second orifice 58 prohibits the passage of asbestos or metal dust outward through first orifice 56 and/or second orifice 58. The sealing strips 60, protective boot 22, fan 64, and the aforementioned controlled air flow thereby prohibit the unwanted release of hazardous dust and shavings during the machining operation. The lathe operator is further protected by the enclosed housing 12 from the hot, airborne shavings produced during the grinding operation.

Fan 64 preferably operates at approximately 60 cubic feet per minute (CFM) and, during operation, continuously removes the unwanted asbestos and metal dust suspended and trapped within housing 12 through hose 66 and filter 68. Filter 68 is similar to a conventional automobile engine filter and collects most of the hazardous dust from the enclosure 12 as the withdrawn air passes therethrough. The remainder of the withdrawn hazardous dust is collected in receptacle 70, which may be disconnected from filter 68 and cleaned periodically. The filter 68 may also be replaced periodically. The fan 64, hose 66, filter 68 and receptacle 70 permit the desired collection of and prohibit the undesirable release of hazardous dust.

As illustrated in FIG. 5, the heavier metal shavings which are not removed by fan 64 are collected by the tray 72 which rests on the floor 32e of bottom 32. The tray 72 may also be removed periodically from enclosure 12 through access panel 32d for cleaning purposes. It is to be understood that the tray 72 and/or floor 32e may also be shaped to permit the natural gravitation of the heavier metal shavings toward the center of or one end of floor 32e. The enclosure 12, floor 32e and tray 72 thus keep the floor in the vicinity of the lathe 14 free of metal shavings produced during the operation of the lathe.

In the preferred embodiment, the ON/OFF switch (not shown) for fan 64 is separate from the ON/OFF switch (not shown) for lathe 14 and the fan switch is preferably located on the lath 14 immediately below the lathe switch. After the desired grinding operation is completed, the lathe 14 is turned OFF while fan 64 remains ON to completely evacuate the hazardous dust from housing 12. The brake drum or disc 18 is thereafter removed from arbor 16 through access panel 32d and a second or subsequent brake drum or disc is attached to arbor 16 and the aforementioned process is repeated. It is to be understood that arbor 16 need not be removed from housing 12 after it is initially inserted through orifice 56 and that the diameter of the drum or disc 18 will normally be greater than the diameter of orifice 56.

Insulation 74 is preferably the Fiberglas 700 Series Industrial Insulation manufactured by Owens-Corning Fiberglas Corporation or a type similar thereto and is approximately one (1) inch thick. It is also to be understood that, although fan 64 is relatively quiet during operation, the enclosure 12 provides noise and thermal insulation even without the addition of insulation 74. Finally, the utilization of transparent panels in top 30 and bottom 32 or a transparent window 76 in the invention enclosure 12 permits the lathe operator to view and control the entire grinding process in the vicinity of the lathe 14 without the concern of undue inhalation of or exposure to asbestos and/or metal dust or the concern of being struck by hot, airborne shavings.

In summary, the suspended asbestos and metal dust is initially trapped in the housing 12 which is mounted to the lathe 14 and thereafter removed from the housing 12 by the controlled air current produced by fan 64. Furthermore, fan 64 accomplishes the dual purposes of (1) prohibiting the outward passage of the suspended dust through first orifice 56 and second orifice 58 by drawing ambient air into enclosure 12 through orifices 56 and 58 and past the grinding area away from orifices 56 and 58, and (2) removing the trapped dust from the enclosure 12. Finally, the heavier metal shavings are collected in the bottom 32 of housing 12 rather than on the floor in the vicinity of lathe 14.

While the invention lathe dust enclosure and method for collecting dust and shavings has been described in connection with the preferred embodiment, it is not intended to limit the invention to the particular forms set forth, but on the contrary, it is intended to cover such alternatives, modifications and equivalents as may be included within the spirit and scope of the invention as defined by the appended claims.

I claim:

1. Apparatus for collecting airborne particles produced during the operation of a drum and disc lathe, comprising:
   a housing adapted to be substantially sealed comprising a ceiling, a floor, and a plurality of sides, at least one of said sides being adapted to receive therethrough an arbor of said lathe and a cutting tool;
   means for removing said airborne particles from said housing; and
   means for collecting said airborne particles exterior to said housing.

2. Apparatus for collecting airborne particles, as recited in claim 1, wherein said means for removing said airborne particles from said housing comprises a fan connected to a side of said housing.

3. Apparatus for collecting airborne particles, as recited in claim 2, wherein said means for collecting said airborne particles exterior to said housing comprises a hose connected on a first end thereof to said fan and on a second end thereof to a filter, said filter being connected atop a collection receptacle.

4. Apparatus for collecting airborne particles produced during the operation of a drum and disc lathe, comprising:
   a housing adapted to be substantially sealed comprising a ceiling, a floor, and a plurality of panels, at least one of said panels having a first orifice for receiving an arbor of said lathe therethrough and a second orifice for receiving a cutting tool therethrough, said substantially sealed housing being adapted to trap said airborne particles during said operation of said lathe;
   means for removing said airborne particles from said housing; and
   means for collecting said airborne particles exterior to said housing.

5. Apparatus for collecting airborne particles, as recited in claim 4, further comprising a plurality of sealing strips connected to said housing for substantially covering said second orifice.

6. Apparatus for collecting airborne particles, as recited in claim 5, wherein said panels are insulated.

7. A housing for enclosing the grinding area of a drum and disc lathe, comprising:
   a ceiling;
   a floor; and
   a plurality of side panels intermediate to said ceiling and said floor, said plurality of panels comprising a first panel having a first orifice for receiving an arbor of said lathe therethrough and a second orifice for receiving a cutting tool therethrough, said second orifice being substantially covered by a plurality of sealing strips attached to said housing.

8. A housing for enclosing the area of a drum and disc lathe, as recited in claim 7, further comprising a second panel adapted to permit access said arbor for attachment of said drum or disc thereto.

9. A housing for enclosing the grinding area of a drum and disc lathe, as recited in claim 8, further comprising a tray on said floor for receiving particles from said drum or disc during operation of said lathe.

10. Apparatus for collecting airborne dust and metal shavings produced during the operation of a drum and disc lathe, said lathe having means for connecting a cutting tool thereto and an arbor having a protective boot thereon, comprising:
    an enclosure adapted to be substantially sealed comprising a top hingedly connected to a bottom, said bottom comprising a plurality of side panels, one of said bottom side panels having a first orifice adapted to receive said arbor therethrough and a second orifice adapted to receive said cutting tool therethrough, said top comprising a plurality of sealing strips adapted to substantially seal said second orifice, said protective boot substantially sealing said first orifice after said arbor is inserted therethrough, said substantially sealed enclosure thereby being adapted to trap said airborne dust;
    a dual purpose fan connected to another of said bottom side panels for continuously drawing air into said enclosure through said first and second orifice past a grinding area of said lathe within said enclosure and thereafter withdrawing said air from said enclosure, said fan thereby prohibiting outward passage of said airborne dust through said first and second orifice and removing said trapped airborne dust from said enclosure;
    a hose connected on a first end thereof to said fan on a second end thereof to a filter connected atop a collection receptacle, said filter and said collection receptacle collecting said airborne dust suspended in said air withdrawn from said enclosure by said fan; and
    a tray for collecting said metal shavings within said enclosure.

11. A method for collecting airborne particles produced during the operation of a drum and disc lathe, comprising the steps of:
    attaching said drum or disc to be machined to an arbor of said lathe;
    enclosing a grinding area of said lathe;
    trapping said airborne particles within said enclosed grinding area during said operation of said lathe; and
    withdrawing said airborne particles from said enclosed grinding area to a means for collecting said airborne particles exterior to said enclosed area.

12. A method for collecting airborne particles produced during the operation of a drum and disc lathe, as recited in claim 11, further comprising the step of collecting heavier shavings produced during said operation of said lathe in a tray within said enclosed grinding area.

* * * * *